United States Patent
Kini et al.

(10) Patent No.: US 8,732,534 B2
(45) Date of Patent: May 20, 2014

(54) PREDICTIVE INCIDENT MANAGEMENT

(75) Inventors: Prashanth Kini, San Mateo, CA (US);
Richard Tauriello, Belmont, CA (US);
Marcos M. Campos, Billerica, MA (US); Boriana Milenova, Reading, MA (US); Charlie Sum, Cupertino, CA (US); Mihaela Dediu, Bucharest (RO); Kevin Timoney, Dublin (IE)

(73) Assignee: Oracle International Corporation, Redwood Shores, CA (US)

( * ) Notice: Subject to any disclaimer, the term of this patent is extended or adjusted under 35 U.S.C. 154(b) by 420 days.

(21) Appl. No.: 13/235,020

(22) Filed: Sep. 16, 2011

(65) Prior Publication Data

US 2012/0072781 A1    Mar. 22, 2012

Related U.S. Application Data

(60) Provisional application No. 61/384,204, filed on Sep. 17, 2010.

(51) Int. Cl.
*G06F 11/00* (2006.01)

(52) U.S. Cl.
USPC .................. 714/47.1; 714/47.2; 714/47.3

(58) Field of Classification Search
CPC .................................................. G06F 11/3409
USPC ...................... 714/47.1, 47.2, 47.3
See application file for complete search history.

(56) References Cited

U.S. PATENT DOCUMENTS

| | | | |
|---|---|---|---|
| 6,320,585 B1 * | 11/2001 | Engel et al. .................. | 345/440 |
| 6,651,012 B1 | 11/2003 | Bechhoefer | |
| 7,076,695 B2 * | 7/2006 | McGee et al. ............... | 714/47.2 |
| 7,424,396 B2 | 9/2008 | Dodeja et al. | |
| 7,506,215 B1 | 3/2009 | Maw et al. | |
| 8,060,342 B2 * | 11/2011 | Marvasti ...................... | 702/186 |
| 8,086,708 B2 * | 12/2011 | Breitgand et al. ............ | 709/223 |
| 8,621,284 B2 * | 12/2013 | Kato ........................... | 714/47.1 |
| 2003/0229804 A1 | 12/2003 | Srivastava et al. | |
| 2005/0033809 A1 | 2/2005 | McCarthy et al. | |
| 2007/0162260 A1 | 7/2007 | Nordstrom | |
| 2008/0033991 A1 * | 2/2008 | Basak et al. ................ | 707/104.1 |
| 2009/0112809 A1 | 4/2009 | Wolff et al. | |
| 2012/0072780 A1 | 3/2012 | Kini et al. | |
| 2012/0271594 A1 | 10/2012 | Yan et al. | |
| 2013/0086431 A1 * | 4/2013 | Arndt et al. .................. | 714/47.1 |

OTHER PUBLICATIONS

U.S. Appl. No. 12/886,891, filed Sep. 21, 2010, Notice of Allowance, Feb. 7, 2013.

* cited by examiner

*Primary Examiner* — Joshua P Lottich
(74) *Attorney, Agent, or Firm* — Hickman Palermo Truong Becker Bingham Wong LLP; Adam C. Stone

(57) ABSTRACT

An incident predictor system is described herein for predicting impactful incidents in which server computer system operations fail or perform poorly. According to one embodiment of the invention, the incident prediction system trains a generalized linear model (GLM) to predict when a system health indicator will reach a level that represents an incident for the server system.

26 Claims, 6 Drawing Sheets

FIG. 3

| Wait Class | %time spent in wait class |
|---|---|
| commit | 10% |
| user I/O | 40% |
| network | 30% |
| user locking | 20% |

300

PREDICTIVE INCIDENT MANAGEMENT

PRIORITY CLAIM; RELATED APPLICATION

This application claims the benefit of Provisional Appln. 61/384,204, filed Sep. 17, 2010, the entire contents of which is hereby incorporated by reference as if fully set forth herein, under 35 U.S.C. §119(e).

The present application is related to U.S. patent application Ser. No. 12/886,891, entitled "A Continuous System Health Indicator for Managing Computer System Alerts", filed Sep. 21, 2010.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Computer system technicians prefer to detect and begin resolving incidents in which system operations are failing or performing poorly before end-users of the system contact them with complaints. To that end, organizations often invest in monitoring software that is capable of collecting hundreds of distinct measurements. An organization may devote human resources to periodically reviewing the measurements and conducting further investigation into measurements that indicate a current or potential future incident.

One problem that arises when using such monitoring software on a large complex system that may experience a large number of independent problems is that alerts are generated for issues that do not require attention. Such false positive alerts waste precious time as technicians diagnose non-problems, and false positive alerts obscure the alerts that do represent critical problems.

Single Measurement Thresholds

One approach to automated incident detection is to define alerting thresholds for certain individual measurements while leaving other measurements without thresholds, even though those other measurements may provide insight into the nature of the incident. One challenge of single-measurement thresholds is that a single incident can, over time, affect the values of multiple measurements, often leading to each such affected measurement independently causing an alert. It may not be obvious how many distinct problems need to be addressed, with the consequent risks of redundant investigation (when a single problem is treated as several) or delayed response (when several problems are present, but one is incorrectly assumed to be the root cause of the others).

Another challenge is that the reliability of the alert depends on choosing the correct threshold for each individual measurement. An incorrectly chosen threshold value can result in either generating false positive alerts or missing important alerts. Even if thresholds for identifying critical problems (referred to herein as a critical threshold) could be accurately chosen, an alert is not generated until the system is already experiencing a critical problem.

One goal is to be able to predict that a critical problem is imminent based on a measurement value that is still at a sub-critical level. A sub-critical alert would indicate that the system is not yet experiencing a critical problem, but soon will be if steps are not taken to thwart the impending problem. For example, if a process that is run to generate database table statistics repeatedly fails, the statistics used in generating query execution plans may become outdated over time. Eventually, the performance of some queries may degrade due to relying on outdated statistics information. It may be difficult to set a threshold that accurately predicts a problem before the problem becomes critical and which does not generate too many false positive alerts.

Another limitation of single-measurement thresholds is that it is often necessary to examine multiple measurements in order to identify how many users' operations and which types of operations are failing or executing inefficiently. If a failure or inefficiency impacts only a single user, technicians would usually prefer not to be alerted by the monitoring system. The information conveyed by the occurrence of a single-measurement alert is typically not by itself sufficient to accurately prioritize the alert. A technician must be assigned to investigate each such alert, by examining the totality of thresholded and un-thresholded measurements, to determine whether it is worthwhile to take action on it. The effort of responding to the alert is wasted in those cases when the alert is not worth taking action on, so technology that reduces the number of false positive alerts would reduce labor costs.

Classification Model for Detection

In response to the shortcomings of using single-measurement threshold, an alternative approach is to train a machine learning algorithm to determine a relationship between available measurement values and end-users' subjective evaluations of incidents. Training such a model for incident detection requires a human to label each of a set of monitored measurements for a certain time interval with an indication of the human's subjective perception of system performance. The labels are chosen from a short list (for example, "bad performance", "normal performance"). The resulting model can be applied to the current monitored measurements to derive an evaluation as to which label should be used to describe the current state.

A challenge in implementing such a machine learning solution is that historical subjective evaluations with precise beginning and ending times of incidents are unlikely to be available. Furthermore, the process of regularly recording such subjective evaluations is an expense end-users are likely to be reluctant to undertake in the absence of evidence that the machine learning algorithm will be successful.

Therefore, even if one seeks to gather subjective evaluations and base alerting on what can be learned from them, it would be helpful to seed those evaluations by soliciting user input for only those time periods during which there is a high probability of user dissatisfaction. The alerts would provide value by increasing end-user goodwill and would identify the time intervals for which subjective feedback is most needed. In addition to reducing the amount of data the end users are asked to look at, directing end users to evaluate particular time intervals also facilitates tracking their progress.

BRIEF DESCRIPTION OF THE DRAWINGS

The present invention is illustrated by way of example, and not by way of limitation, in the figures of the accompanying drawings and in which like reference numerals refer to similar elements and in which:

FIG. 3 is a table showing example values for the percentage of time spent waiting for events in each wait class, according to an embodiment of the invention;

DETAILED DESCRIPTION

Figure 1:
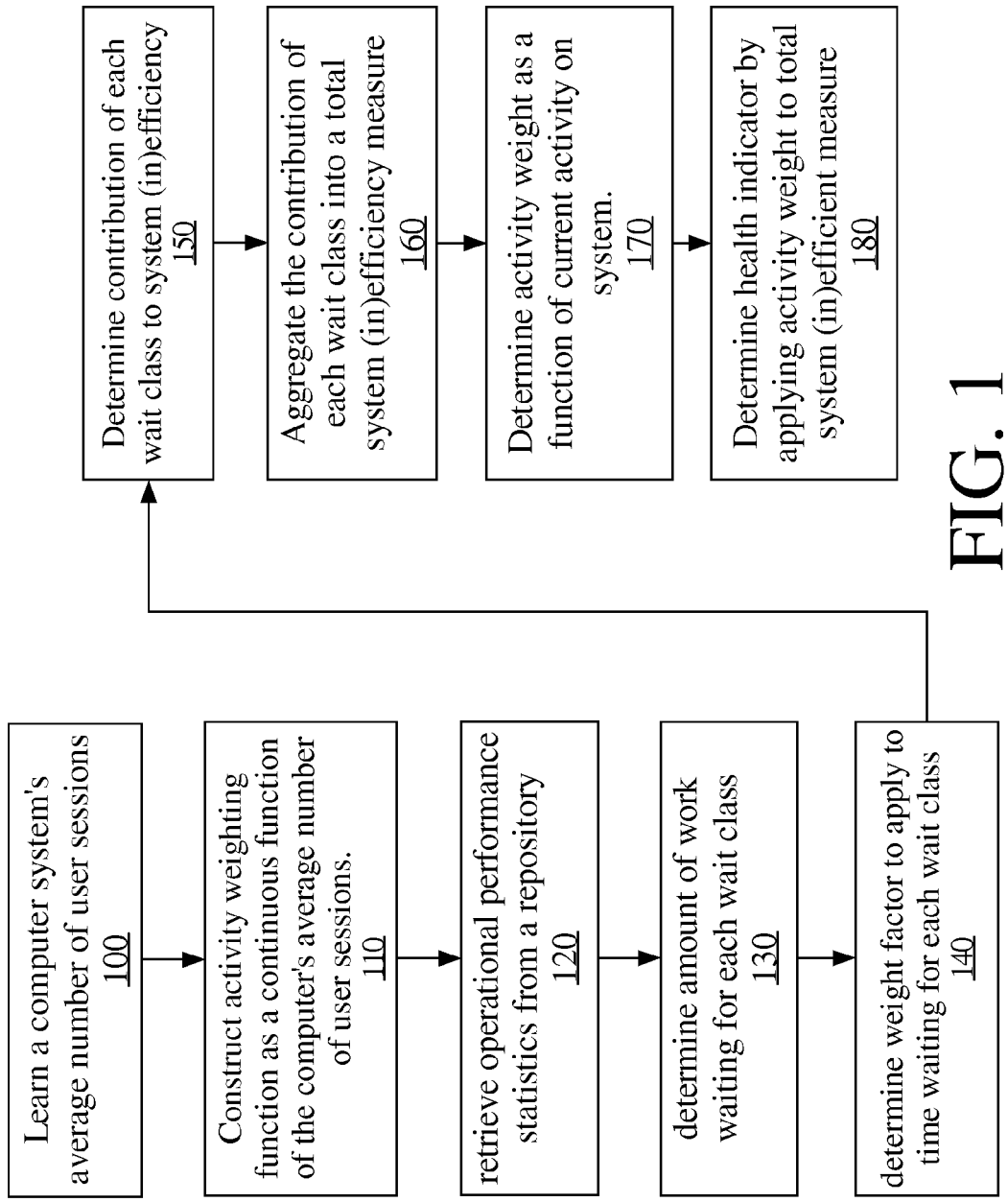
FIG. 1 is a flow diagram showing steps for calculating a system health indicator, according to an embodiment of the invention.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

For a server computing system, an indicator that correlates with poor performance is how much time active user sessions spend waiting on events. A system health indicator based upon the amount of time user sessions spend waiting may be relied upon to determine whether the server system is experiencing a problem that requires human attention. However, even if the server system is performing inefficiently, if the poor performance is not impacting any user or large group of users, that it may not be necessary for the source of the poor performance to be diagnosed and fixed. Further, when the overall workload is low and/or the server system is responsive overall, there may not be a need to generate an alert because no harm or inconvenience is caused by the inefficiency.

Workloads that are known to be inefficient are often run outside of business hours, and the business conditions of the monitoring service may preclude manually informing the monitoring system of when those business hours are. For example, such workloads may include multiple concurrent batch jobs. If a long-running job that normally takes 2 hours to run is scheduled to run unattended during the night, there is probably no user waiting for the job to finish. Therefore, if that same job takes four hours to complete on a poorly performing server system instead of the expected 2 hours, the longer running time would not inconvenience any user. Even when a job experiences a more critical problem, unless that particular job absolutely must run to completion that night, the business might prefer to abort the job in the morning (if necessary) and investigate its poor performance when labor costs are lower instead of having a technician urgently alerted in the middle of the night.

Thus, the health indicator should not only measure server system performance in terms of user wait time, but also take into account the extent to which users are impacted by a performance problem so that the system health indicator only crosses an alert threshold when the server system needs to be fixed.

Techniques for calculating such a system health indicator are described in U.S. patent application Ser. No. 12/886,891. According to those techniques, a number of different weighted system health measurement values are combined according to a formula to produce a single numerical value that indicates whether a server system is currently experiencing a problem that requires human attention.

An incident predictor system is described hereafter for predicting impactful incidents in which server computer system operations fail or perform poorly. According to one embodiment of the invention, the incident prediction system trains a generalized linear model (GLM) to predict when a "system health indicator" will reach a level that represents an incident for the server system.

Calculation of a System Health Indicator Value

As explained in U.S. Pat. No. 12/886,891, at a given time, a server system such as, for example, a database server system, a web server system, an application server system, etc, may have a number of threads of execution actively performing work ("active user sessions") requested by application clients on behalf of users. During server system execution, measurement values indicating time active user sessions spend waiting on "wait events" are collected by a measurement system. These measurement values are aggregated by the measurement system into "wait classes". The measurement system then computes the system health indicator as a scaled sum of scaled waiting times for each wait class where the sum is scaled by an amount of overall activity in the server system and the waiting times are scaled by the user impact of each wait class. Better server system performance may be indicated by a low system health indicator value and performance degradation may be indicated by a high system health indicator value. In an embodiment, the system health indicator is computed as:

$$Healthindicator(t) = activityweight(t) * \sum_i workweight_i(t) * timewaiting_i(t)$$

The general steps of computing a system health indicator value for a server computing system during server system operation are illustrated in FIG. 1. For the purpose of explanation, consider the exemplary system of FIG. 2 in which server system 200 is performing work on behalf of user sessions 230. In this example, there are 102 user sessions. There are seven processing states 210-216 depicted inside server system 200. The number to the left of each processing state is the number of the user sessions in that processing state. There are 2 user sessions that are in idle state 210, which means that in this example, there are 100 active user sessions (idle sessions are not active). There are 2 sessions currently running on CPU 211. There are 13 sessions on run queue 212 scheduled to run. There is only 1 session waiting for a transaction to commit in processing state 213 that corresponds to wait class "commit." There are 29 sessions waiting for disk I/O events to complete in processing state user I/O 114 corresponding to wait class "user I/O". There are 15 sessions waiting for network I/O in processing state 115 corresponding to wait class "network", and 40 sessions waiting for a lock on a shared object to be released in processing state 116 that corresponds to wait class "user locking." A wait class may represent waiting for more than one kind of related event. For example, there are many different events related to disc I/O (e.g. read vs. write events). Sessions waiting for any of these events would be considered waiting in wait class user I/O.

Several measurement values are retrieved from the repository and used to determine the system health metric:

The percentage of active user sessions' server-side time spent waiting for each type of wait event is a measure of performance that is based on user session wait times. For each wait class, the wait time for each wait class is aggregated across all sessions. The percentage of time for each wait class is the wait time for that wait class relative to the total time user sessions spend in any processing state.

For each wait class, the average number of user sessions waiting for an event in that wait class is determined by averaging the number of sessions counted in each wait class across snapshots of data that is captured more frequently (e.g., every five minutes) than the aggregation time interval (e.g., once an hour). Because the measurement used in the calculation is an aggregation of multiple individually collected data points, the average number might not have the same value as the latest collected data point. Nevertheless, for simplicity of expression, the present tense is used herein to describe the average number of user sessions that are waiting rather than the more accurate but cumbersome expression of "have been waiting during the interval." This use of present tense is similarly used for all aggregated measurements over the time interval.

The total number of active user sessions is a count of all of the user sessions waiting for any wait event in addition to the running and scheduled to run user sessions.

the average number of active user sessions typically found on the system: This baseline number is acquired during a machine learning phase.

Returning to FIG. 1, in step 100, the measurement system enters a learning cycle to determine an activity measurement based on the average number of active user sessions normally handled by the server system.

In Step 110, an activity weighting function is constructed. In one embodiment, the activity weighting function has the following form:

$$activityweight(t) = \frac{e^{activity(t)-0.8*baselineactivity}}{1 + e^{activity(t)-0.8*baselineactivity}}$$

The activity weighting function is a scaling function (in this embodiment, a logistic function) that takes as input the sever computer system's number of active user sessions at time t on whose behalf the server system performs work (activity(t)). The activity weighting function is designed to return an activity weighting factor that is a value between 0 and 1. The function returns a value of 0.5 when the current active session count is 80% of the baseline average for the system (baselineactivity) as determined during the learning phase as described above.

The system health indicator value for a time interval is determined based on the number of active sessions during that interval along with fined grained time measurement values for each wait class. In Step 120, the time performance measurement values are retrieved from a repository. Each measurement value activity(t), timewaiting$_i$(t), work$_i$(t)) is a rolling average of the corresponding measurement over the hour preceding time t. In an embodiment intended to provide real-time monitoring, time t is the most recent time for which measurements are available.

In the system health indicator computation, wait classes are partitioned by proximate cause into i number of wait classes. In an embodiment, the waiting time measurement (timewaiting) is the percentage of time that user sessions collectively spend waiting on a particular wait class.

For example, table 300 of FIG. 3 shows example percentage of wait times across all 100 active sessions for each of the wait classes. For example, according to the table values, the 100 active sessions have spent 40% of their time waiting for user I/O. The number of user sessions waiting in various wait classes is taken from FIG. 2. As mentioned earlier, FIG. 2 shows an average (e.g. over the previous hour) of 1 session waiting for a transaction commit to complete, 29 waiting for user I/O, 15 waiting for a network response, and 40 blocked waiting for a lock to be released.

In Step 130, the total time that work is spent waiting on each of the i wait classes is determined. Thus, the timewaiting$_i$ measurement is an aggregation of time that all user sessions spent in wait class i in relation to time spent in other states.

Each wait class time aggregation is also weighted based on the amount of work waiting due to that wait class, where the amount of work indicates the user impact of waiting for a particular wait class and is a measure whose value distinguishes cases where a single operation or sequence of operations is waiting from cases where multiple, independent operations are waiting. In an embodiment, the user impact weighting factor, workweight$_i$, is a function of the average number of user sessions that are waiting on wait class i (work$_i$).

In Step 140, a work impact weighting factor for the wait time measurement for each particular wait class is determined. In an embodiment, workweight$_i$ is a logistic function of work$_i$. A logistic function is a sigmoidal function that returns a value between 0 and 1. In an embodiment, the logistic function is derived so that the function returns 0.5 when the average number of sessions waiting in a wait class is 1.5. Thus, when the average number of sessions waiting on a wait class is more than 2, the impacted work weighting factor for the time spent in that wait class will be close to 1, so that the time spent in that wait class is fully reflected in the system health indicator value. If the average number of sessions waiting on a wait class is 1 or less, then the logistics function will return a number close to 0, and the contribution to the system health indicator of the time spent in that wait class is greatly diminished. In an embodiment, the following instantiation of the logistic function is used to give a slope that is not too steep, enhancing the continuity of the system health indicator:

$$workweight_i(t) = \frac{e^{4work_i(t)-6}}{1 + e^{4work_i(t)-6}}$$

Figure 2:
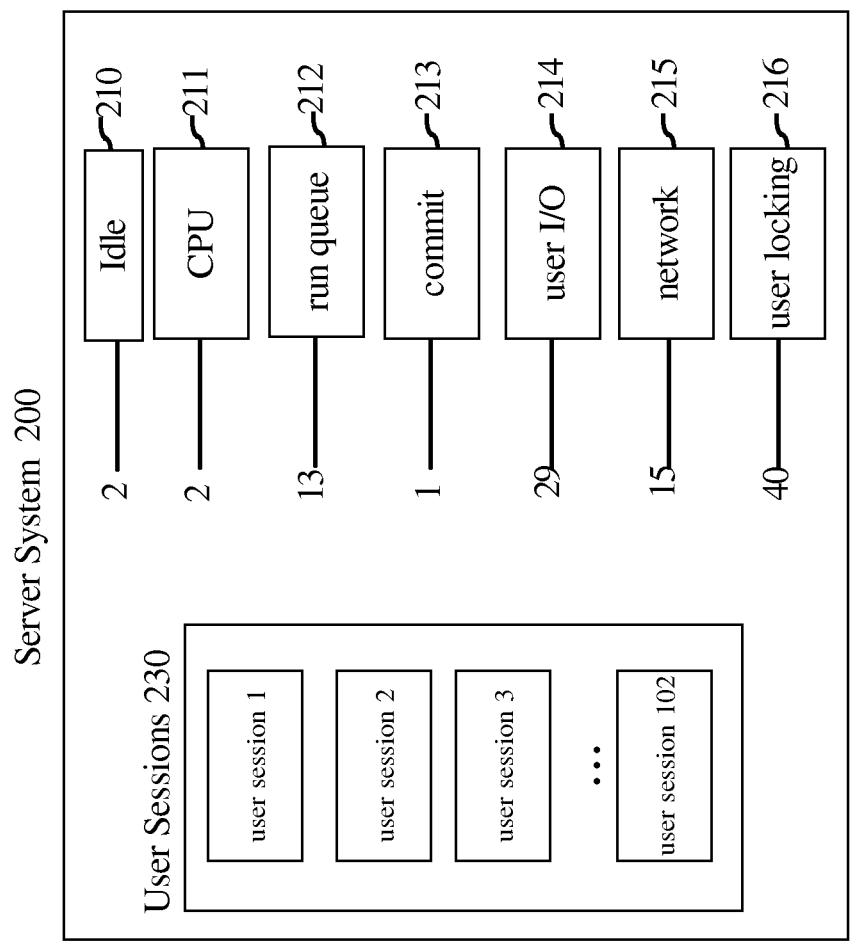
FIG. 2 shows an exemplary system server with user sessions in different processing states, according to an embodiment of the invention.

In the example of FIG. 2, the impact to work waiting for all wait classes except for a transaction commit will receive full weight, and any inefficiency created by waiting for transaction commits will contribute a diminished amount to the system health indicator. For example, the weighting factor applied to time spend waiting for a transaction to commit is determined as:

$$workweight_{commit} = \frac{e^{4*1-6}}{1 + e^{4*1-6}} = \frac{e^{-2}}{1 + e^{-2}} = .119$$

In Step 150, the contribution towards the system health indicator from a particular wait class i is determined by multiplying the percentage of time spent in each wait class across active sessions by the work impact of each wait class: workweight$_i$*timewaiting$_i$.

In Step 160, the contribution towards the system health indicator from each of the wait classes is added together:

$$\sum_i workweight_i * timewaiting_i.$$

For example, the contribution of each of the wait classes of FIG. 2 is shown in the table below:

| Wait class | Sessions waiting | workweight | % time | Weighted % time |
|---|---|---|---|---|
| commit | 1.00 | 0.119 | 10.0 | 1.19 |
| user I/O | 29.0 | 1.00 | 40.0 | 40.0 |
| network | 15.0 | 1.00 | 30.0 | 30.0 |
| user locking | 40.0 | 1.00 | 20.0 | 20.0 |

In Step 170, the activity weight factor is determined based on the weighting function constructed in Step 110. The activity weight factor, activityweight, is a function of the overall active session count. Thus, the activity weight factor is a weighting factor that dramatically lowers the overall system health indicator when the server is processing a less than average work load.

For example, referring again to FIG. 2, the number of active user sessions on Server 200 is 100. Assuming the historical average (baseline) number of active sessions on Server 200 is also 100, then the activityweight(t) is computed as:

$$activityweight(t) = \frac{e^{100-0.8*100}}{1+e^{100-0.8*100}} = \frac{e^{20}}{1+e^{20}} = 0.999 \ldots$$

In Step 180, the system health indicator is determined by applying the activity weight factor to the not-yet-weighted system health indicator of the system determined in Step 160.

For example, calculating to 3 significant digits, the sum of the contribution to the system health indicator for all the individual wait classes of FIG. 2 is (1.19+40.0+30.0+20.0) or 91.2. Thus, the system health indicator value for this example is 0.999*91.2=91.1.

In an embodiment, the flow described in FIG. 1 is repeated every ten minutes, beginning with Step 120. The fact that the interval of measurement collection and evaluation (ten minutes) is a fraction of the interval over which each rolling average is calculated (one hour) has the effect of smoothing out the system health indicator value.

In an embodiment, the flow repeats from Step 100 every seven days to keep the baseline activity variable consistent with observed workloads.

Incident Predictor System

According to one embodiment of the invention, the incident predictor system of the present invention has at least three modules: a real-time monitoring data collection module, a base lining module, and an incident detection and prediction module. The real-time monitoring data collection module collects selected real-time monitoring metric values of the target server computer system and stores the information in a monitoring database for further processing. The target server computing system can be a database server system, a web server system, an application server system, or virtually any other type of server computing system for which appropriate metrics are available. Further, the target server computing system may be a single service computer or a cluster of server computers. The base lining module analyzes collected history monitoring data with the intention of determining a normal functionality baseline of the target server computer system. In addition, based on the determined normal functionality baseline, the base lining module computes critical thresholds for relevant metrics that define when the target computer system is under stress. An abnormal situation for the target computer system may be marked by when the critical thresholds are exceeded. The incident detection and prediction module detects incidents using the computed critical thresholds and incident prediction is accomplished using prediction models trained on the collected history monitoring data.

Data Collection

According to one embodiment, the real-time monitoring data collection module of the incident predictor system collects real-time metric values for the monitored server system. Real-time in this circumstance means as close to real-time as is feasible, for example, every five minutes or more frequently (collection interval). In one embodiment, the collection module collects at the collection interval granular metric values for the target server system for calculating the system health indicator described above with respect to FIG. 1. From this real-time granular data, rolling averages are calculated on a periodic basis, for example, every ten minutes (rollup interval). Each rolling average may average real-time data collected for a past period of time, for example, one hour (rollup window length).

For example, the data collection module may repeat steps 120 through 180 of FIG. 1 at the rollup interval (e.g., every ten minutes) to produce a time-related series of system health indicator values. In one embodiment, each produced system health indicator value is stored in the monitoring database. Each stored system health indicator value may be seasonally labeled to indicate the time of day, week, month, etc. at which the corresponding system health indicator value was calculated. Seasonality information may be used by the base lining module when computing computes critical thresholds for relevant metrics that define when the target computer system is under stress. For example, using the seasonality information, the base lining module can determine that a high system health indicator value for the target server computing system during the middle of the night does not constitute a period of stress while the same system health indicator value during the middle of the day does.

In one embodiment, in addition to or instead of calculating a system health indicator value for the target server computing system at the rollup interval, the collection module calculates a central processing unit (CPU) utility metric value at the rollup interval. To calculate the CPU utility metric value, the collection module may average CPU utility sample values collected at the collection interval over the past rollup window length. A CPU utility sample value indicates the load on the server computing system in terms of percentage of CPU utilized at a particular point time or average percentage CPU utilized over a small interval of time (e.g., less than five minutes). A CPU utility metric value indicates the average load on the server over a rollup window in terms of percentage of CPU utilized.

Whether one or both of a system health indicator value and a CPU utility value is calculated at the rollup interval, both metrics represent an average of target system performance over a rollup window of time based on averaging granular samples collected during the rollup window. The base lining module and the detection and prediction modules use rolling average metrics to avoid spikes in metric values collected at the collection interval unduly affecting the incident detection and predictions (e.g., generating false positive alerts or predictions) and to more reliably detect sustained periods of stress for the target server computing system. For simplicity of expression, the term "rollup metric value" will be used to refer to a metric value that represents an average of metric value collected or computed during a rollup window. For example, a rollup metric value may be an average of multiple system health indicator values computed every ten minutes during a rollup window according to the process of FIG. 1 described above.

Base Lining Normal Functionality

In one aspect, the base lining module attempts to understand normal functionality of the target server computing system. To do so, the base lining module analyzes rollup metric values collected over a training period (e.g., one month) during which the rollup metric values are calculated and collected to determine a target server computing system activity baseline. This collected set up rollup metric values may be referred to as "training data". Based on the training data, the base lining module calculates critical thresholds that bound the normal activity baseline. These critical thresholds represent a maximum limit for the rollup metric values under which the target server computing system can be considered to be functioning normally Exceeding this maximum limit defines the start of a period of stress for the target server computing system.

Critical Thresholds

In one embodiment, a critical threshold is calculated in one of two ways by the base lining module, either as a constant value or as a percentile of the training data. The manner in which a critical threshold is calculated may depend on the type of the rollup metric values. For example, for system heath indicator rollup metric values, a percentile critical threshold may be used while for CPU utility rollup metric values, a constant value critical threshold may be used. More generally, a constant value critical threshold is appropriate when a rollup metric value that exceeds the constant value represents stress for the target server computing system. For example, anytime a CPU utility rollup metric value exceeds 95%, the target computing system is likely under stress.

A percentile critical threshold may be appropriate when a rollup metric value that exceeds a constant value does not necessarily represent stress for the target server computing system. For example, for a busy server computing system, a high system health indicator rollup metric value can be normal, while the same high value for an idle system may not be normal.

In one embodiment, the critical threshold for the system health indicator rollup metric value is computed by the base lining module as the 95th percentile or some other user-specified percentile of the training data. A minimum limit may be applied to the computed critical threshold to avoid the system health indicator critical threshold from dropping too low for a target server system that was idle for a substantial portion of the training period. In this case, where the critical threshold computed based on a percentile is below the minimum limit, the minimum limit may be used as the critical threshold instead of the computed threshold. In one embodiment, the minimum limit is user-specified.

Relax Thresholds

In one embodiment, the base lining module also calculates a relax threshold for each of the computed critical thresholds to indicate the point below which the target server computing system is no longer under stress. For example, the relax threshold for a computed critical threshold may be some fixed percentage less (e.g., 20%) than the computed critical threshold. In one embodiment, to avoid repeatedly closing and re-opening an incident as collected rollup metric values waver above and below the relax threshold, an incident is closed only after collected rollup metric values have been continuously under the critical threshold for a pre-determined period of time, for example, one hour and the current rollup metric value is under the relax threshold.

In one embodiment, since normal activity baseline for a target server computing system can change over time, the base lining module regularly re-computes critical and relax thresholds on an ongoing basis. For example, the base lining module may re-compute critical and relax thresholds every n number of days, for example, every seven days, using a new more recently collected set of training data.

Prediction

The critical and relax thresholds computed by the base lining module identify current periods of target server computing system stress as they occur. The incident predictor system of the present invention may be used not only to identify current periods of stress, but also to predict periods of stress before they occur. In one embodiment, a data mining prediction model using a generalized linear model (GLM) regression algorithm is used for anticipating periods of stress. The prediction is multivariate. For example, in one embodiment in which the target server computing system is a database server computing system, the following multivariate predictors are used to predict with good accuracy a system health indicator value indicating stress up to thirty minutes in advance of the predicted stress actually occurring:

database server host rollup metric values (used memory, machine load, cpu utility, and paging activity);
database rollup metric values (cluster, application, configuration, commit, user I/O, application database classes metrics, and number of sessions);
system heath indicator rollup metric values; and
seasonality predictors referring to hour and day of week.

Incident Definition and Incident Bridging

An incident predicted by the incident predictor system can be true positive prediction, a true negative prediction, a false positive prediction, or a false negative prediction. A true positive prediction is one where the incident predictor system predicts an incident before the stress period actually starts. A false positive prediction is one where the predicted stress period does not actually occur. A false negative prediction is one where the stress period is detected but was not predicted. A true negative prediction is one where no stress period is predicted and no stress period is detected.

In one embodiment, the incident predictor system employs a technique referred to herein as incident bridging. A goal of the incident bridging technique is to "bridge" consecutive periods of stress into a single incident so that less alerts are generated by the incident predictor system. In particular, instead of generating an alert for each consecutive period of stress, a single alert may be generated for all bridged periods thereby reducing possible technician confusion resulting from repetitive alerts.

In one embodiment, the incident predictor system bridges incidents as follows. In case of a false positive prediction, the predicted incident does not end until at least a pre-determined amount of time, for example, one hour, has passed since the last true positive prediction. In case of a true positive prediction or a false negative prediction, the incident does not end until at least the pre-determined amount of time has passed since the last rollup metric value over the critical threshold was collected and the latest rollup metric value collected is less than the relax threshold. The pre-determined amount of time is referred to herein as the bridging interval and, in one embodiment, is configurable by a user of the incident predictor system. The incident predictor system can generate an alert when an incident starts and not generate another alert until the current incident ends and a new incident starts. The bridging interval may be used by the incident predictor system to effectively bridge consecutive stress periods from into one single incident, thereby causing less alerts to be produced.

In one embodiment of the bridging technique, when a prediction is not followed by the predicted incident (i.e., false positive prediction), the determination that the prediction was a false alarm is only made after the incident predictor system has continuously observed an absence of impending danger for at least the past bridging interval amount of time since the prediction was made. During this bridging interval and so long as the prediction model during this time does not indicate actual or a danger of stress, a user interface of the incident predictor system may display a message to a user that the incident predictor system is "waiting for evidence" of stress.

Masking

In one embodiment, the incident predictor system employs a technique referred to herein as masking. A goal of the masking technique is to "mask" out time periods when the system is already under stress and only present periods of onset of system stress for the training of the predictor system. Another goal of the masking technique is to avoid encouraging sensitivity to the early signs of spurious and short duration "spikes" of system stress during the training of the predictor system.

In one embodiment of the masking technique, the training methodology refrains from evaluating or considering the accuracy of predictions issued at times when the rollup metric value already exceeds the critical threshold for the rollup metric.

In another embodiment of the masking technique, the predictor system refrains from evaluating or considering the accuracy of predictions that are followed by periods of time within which the rollup metric value is above the critical threshold for fewer than a specified number of consecutive samples, for example 3 consecutive samples corresponding to 3 samples at an interval of 10 minutes each.

Prediction Thresholds

The incident predictor system computes and uses another set of thresholds to determine whether a predicted metric value starts an incident or not. In one embodiment, three prediction thresholds are computed referred to herein as "red", "orange", and "yellow". The three levels determine how reliable the prediction must be in order to merit alerting the user. The red level prediction threshold is more conservative, in the sense that there is more emphasis on avoiding false positives than on avoiding false negatives. The yellow level threshold is more sensitive, in the sense that there is more emphasis on avoiding false negatives than on avoiding false positives. The orange level is in between the red level and the yellow level thresholds in terms of sensitivity. An alert that exceeds the red threshold is more likely to prove out to be a true positive than an alert that only exceeds the yellow threshold.

In one embodiment, a user of the incident predictor system selects one of the three threshold levels for incident predictor system to use when determining whether an incident should be created depending on the perceived criticality of the accuracy of the predictions made by the incident predictor system against the perceived need to identify as many incidents as possible as early as possible.

In the case there is no incident currently opened for the target server computing system, these prediction thresholds determine when a new incident is created. In one embodiment, where an incident is opened, when a predicted metric value is greater than at least the yellow level threshold, the opened prediction is updated, reinforcing the prediction. The prediction is updated via an additional computer generated report added to a series of reports generated once the incident has been created. The series of reports together form a collection herein referred to as the "incident trace". The incident trace, which may be presented on a graphical user interface of the incident predictor system provides the operator the ability to observe the progression of prediction levels from the first alert through the actual onset of the incident where the rollup metric value first exceeds the critical threshold level. These progression cues allow the user to make choices on when to react to an alert. A user may choose to defer action until the prediction level is at least at yellow for example. Other supporting data may be provided in each report conjunction with the prediction level to further assist the user's decision to react.

The prediction thresholds are computed by the incident predictor system as acceptable data points on a recall-precision curve. For a given period of time during which the incident predictor system generates predictions for a target server computing system (training period), recall is the fraction of all actual incidents during the time period that were successfully predicted (i.e., true positive predictions) and precision is the fraction of all predictions made during the time period that were true positive predictions (as opposed to false positive predictions). An actual incident during the time period may be identified by a rollup metric value that exceeded the critical threshold for the rollup metric value. In one embodiment, the recall-precisions curve is calculated as follows. First, predictions made by the incident predictor system during a prior period of time, for example, the one month training period, are sorted in descending order of the forecasted value.

For each time point in the training period, the GLM model is used to forecast the value of the metric at the chosen future time, for example, 30 minutes ahead, as if each sample in the training set were being evaluated as a potential signal of trouble.

In one embodiment, when evaluating whether to raise an alert, the forecasted value is not directly compared to the critical threshold; instead, a threshold will be applied to the forecasted value that is the result of an optimization process—this type of threshold is herein referred to as a "prediction threshold". For a given prediction threshold under consideration, a prediction is considered a positive prediction if the forecast exceeds the prediction threshold, or a negative prediction if the forecast is below the prediction threshold. A positive prediction is considered a true positive prediction if the actual future value exceeded the critical threshold or a false positive the actual future value was below the critical threshold. A negative prediction is considered a true negative prediction if the actual future value was below the critical threshold or a false negative if the actual future value exceeded the critical threshold. The optimization process searches for the prediction threshold that will give the most desirable trade-off between false positives and false negatives.

In an embodiment, each distinct forecasted value (from un-masked samples, if masking is in use) is conceptually considered as a candidate for the prediction threshold.

In an embodiment, since a forecast that is evaluated as a positive prediction when evaluated with prediction threshold X will still be a positive prediction when evaluated with prediction threshold Y, where Y<X, the search for the optimal prediction threshold can be performed more quickly if the forecasts to be evaluated are sorted in descending order.

Then, in an embodiment, the recall and precision for each prospective threshold are incrementally computing according to the following formulas:

recall=(number of true positive predictions)/(total number of incidents during the training period of time). The total number of incidents is equal to the sum of true positive and false negative predictions.

precision=(number of true positive predictions)/(total number of predictions made during the period of time). The total number of predictions is equal to the sum of true positive and false positive predictions.

Each prospective prediction threshold partitions the samples in the training set into a subset of positive predictions and a disjoint subset of negative predictions. Under the assumption that future samples will resemble the training set, the proportion of training set samples in the positive prediction partition constitutes the probability that each new sample will be a positive prediction. For this reason, that proportion is referred to as the "prediction probability".

Figure 6:
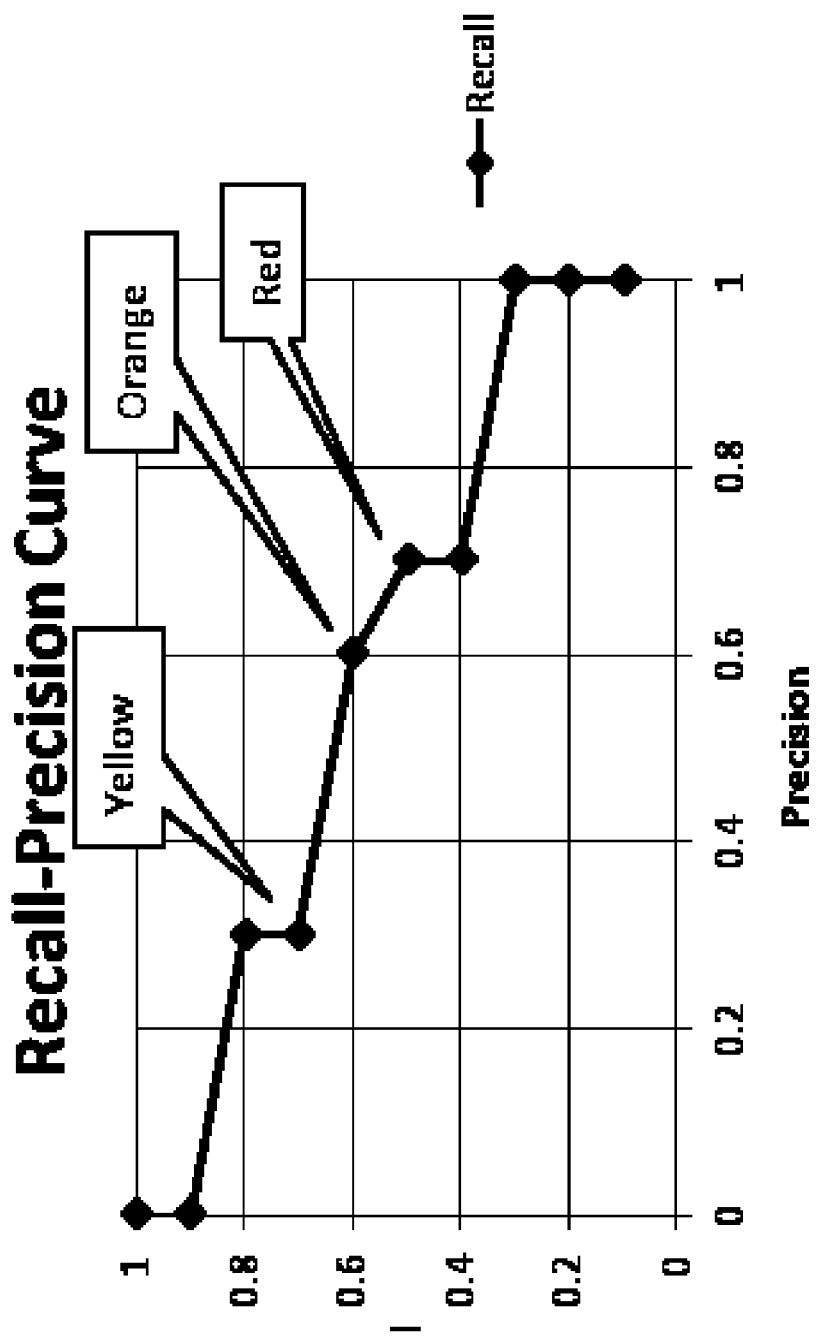
FIG. 6 shows an example of a recall-precision curve constructed to select the yellow, orange, red prediction thresholds, according to an embodiment of the invention.

In one embodiment, the incident predictor systems chooses three points on the recall-precision curve that maximizes recall at three different acceptable precision levels corresponding to the "red", "orange", and "yellow" level prediction thresholds. The recall-precision curve is constructed by plotting the recall value on the y axis and the precision on the x axis with each (x-y) pair corresponding to a point on the list of predictions sorted in descending order of prediction probability for the training data set. See FIG. 6 for a sample recall-precision curve. The red, orange, and yellow thresholds are identified using the F-metric given by:

$$F_\beta = (1+\beta^2)\frac{precision*recall}{\beta^2*precision+recall}$$

The red level puts the emphasis on precision (=0.5). The orange level weighs precision and recall equally (=1). The yellow level puts the emphasis on recall (=2). For each alert level (red, orange, and yellow), the prediction probability that maximizes the corresponding F-metric is selected as the threshold.

Tuning Prediction Thresholds by False Positive Limit

In one embodiment, when the historical prediction data used to calculate the prediction thresholds does not include a sufficient number of actual incidents, the prediction thresholds can drop to a level such that the incident predictor system generates too many false positive predictions. In one embodiment, this problem is solved by adding a maximum limit of acceptable false positive predictions per period of time, for example, per day, when choosing points on the recall-precision curve. In one embodiment, this maximum false positive prediction rate limit is configurable by a user of the incident predictor system through a graphical user interface driven by the incident predictor system. The false positive prediction rate limit as configurable by the user, for example 1 false positive prediction per day, is translated by the incident predictor system to a false positive prediction rate limit corresponding to the actual prediction interval, every 10 minutes for example. For example, a user specified false prediction rate limit of one per day will be translated into a corresponding incident predictor false positive prediction rate of one false prediction in 144 predictions when the predicition interval is every 10 minutes for example. The adjustment of the false prediction rate limit on the user interface has the equivalent impact of selecting a different set of red, orange, yellow points on the recall-precision curve Prediction Flow Algorithm According to one embodiment of the invention, the incident predictor system performs a prediction flow algorithm. Inputs to the algorithm are real-time granular monitoring data collected for the target server computing system. Outputs are alerts that represent current incidents and predicted incidents. For the incident predictor system to predict incidents from input monitoring data, the input monitoring data passes and is transformed through several stages of the algorithm called "flow states".

In one embodiment of the invention, the incident predictor system persists data at each flow state to the monitoring database. The monitoring database may be organized according to a database schema for storing the data at each flow state. If the incident predictor system goes offline, upon starting up again, the system will read the last flow state it was in from the monitoring database and restart the prediction flow algorithm from that flow state.

Figure 4:
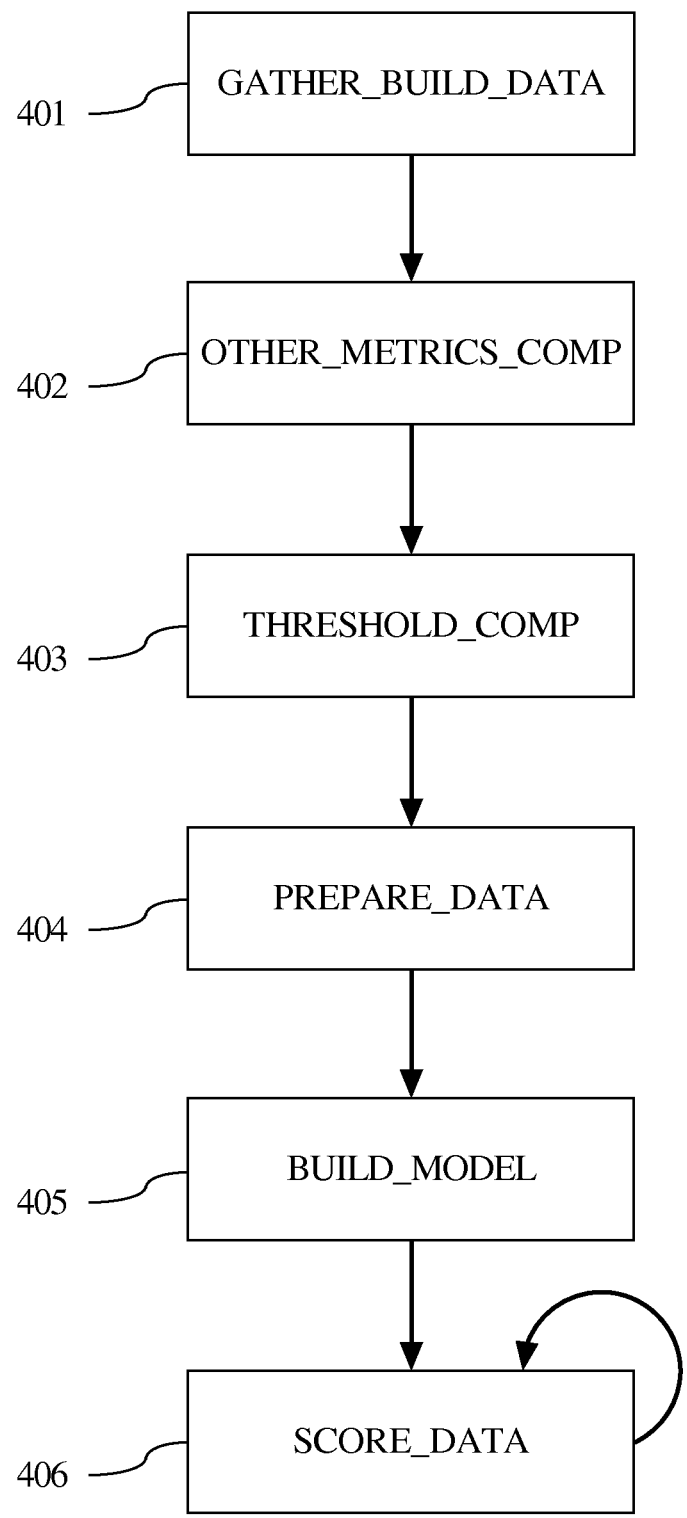
FIG. 4 is a flow diagram of flow states of a prediction flow algorithm, according to an embodiment of the invention.

Turning again to the drawings, FIG. 4 is a flow diagram of the flow states of the prediction flow algorithm according to an embodiment of the invention. The flow starts in the GATHER_BUILD_DATA state 401. The flow remains in this state 401 until a sufficient amount of rollup metric values for the target server computing system have been collected (training period). What is a sufficient amount (i.e., the length of the training period) is defined by a configuration parameter of the incident predictor system. In one embodiment, the default value of this configuration parameter is five days.

When the sufficient amount of rollup metric values have been collected, the flow proceeds to the OTHER_METRICS_COMP state 402. In this state 402, the flow computes system health indictor values using the rollup metric values collected during the training period. To do so, the algorithm of FIG. 1 may be performed. As a result, a series of system health indicator values are produced from the collected training data of rollup metric values. For example, if the training period was five days, a system health indicator value may be computed for regular intervals during the training period such as, for example, every ten minutes. In addition to system health indicator values, other metric values based on the training data may be computed during state 402 such as, for example, CPU utility metric values. The metric values computed at state 402 may be stored in the monitoring database and become part of the training data.

After computing additional metric values for the training period at state 402 based on the training data collected during state 401, the flow proceeds to the THRESHOLD_COMP state 403. In this state 403, critical thresholds for metrics to be predicted are computed based on the training data collected and computed at states 401 and 402 of the flow. In one embodiment, either or both of a CPU utility metric and a system health indicator metric are to be predicted. However, other metrics may be predicted by the incident predictor system and embodiments are not limited to only the CPU utility metric or the system health indicator metric. Computation of a critical threshold for a metric to be predicted is based on the training data collected and computed at states 401 and 402 of the flow.

In one embodiment, the critical threshold computed for a metric to be predicted is either a percentile or a constant value. As mentioned previously, whether a percentile or a constant value is computed may depend on the type of the metric to be predicted. In one embodiment, if a metric to be predicted is CPU utility or similar, then a constant value critical threshold is computed from the training data. If a metric to be predicted is the system health indicator or similar, then a percentile critical threshold is computed from the training data. In addition to computing a critical threshold for each metric to be predicted, a relax threshold for the metric to be predicted is also computed. Once the critical and relax thresholds have been computed, the flow proceeds to the PREPARE_DATA state 404.

In state 404, the flow prepares data for initial prediction model building. In one embodiment, this state 404 includes dynamically creating tables in the monitoring database that represent the prediction model. In one embodiment, the dynamically created tables are dropped and recreated every six hours, when the prediction model is retrained.

After the prediction model has been prepared for build at state 404, the model is trained during the BUILD_MODEL state 405. In one embodiment, this includes computation of the "red", "orange", and "yellow" prediction thresholds.

After the prediction model has been built at state 405, the flow proceeds to the SCORE_DATA state 406. The flow remains in this state and scores incoming rollup metric values, predicting metrics, creating incidents, and generating alerts, for example, by e-mail, in the case incidents are created. In one embodiment, the flow rebuilds the prediction module every six hours, adding to the training set the latest data and re-computing the critical and relax thresholds every seven days, using the last month of training data relative to a current score date.

Hardware Overview

According to an embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
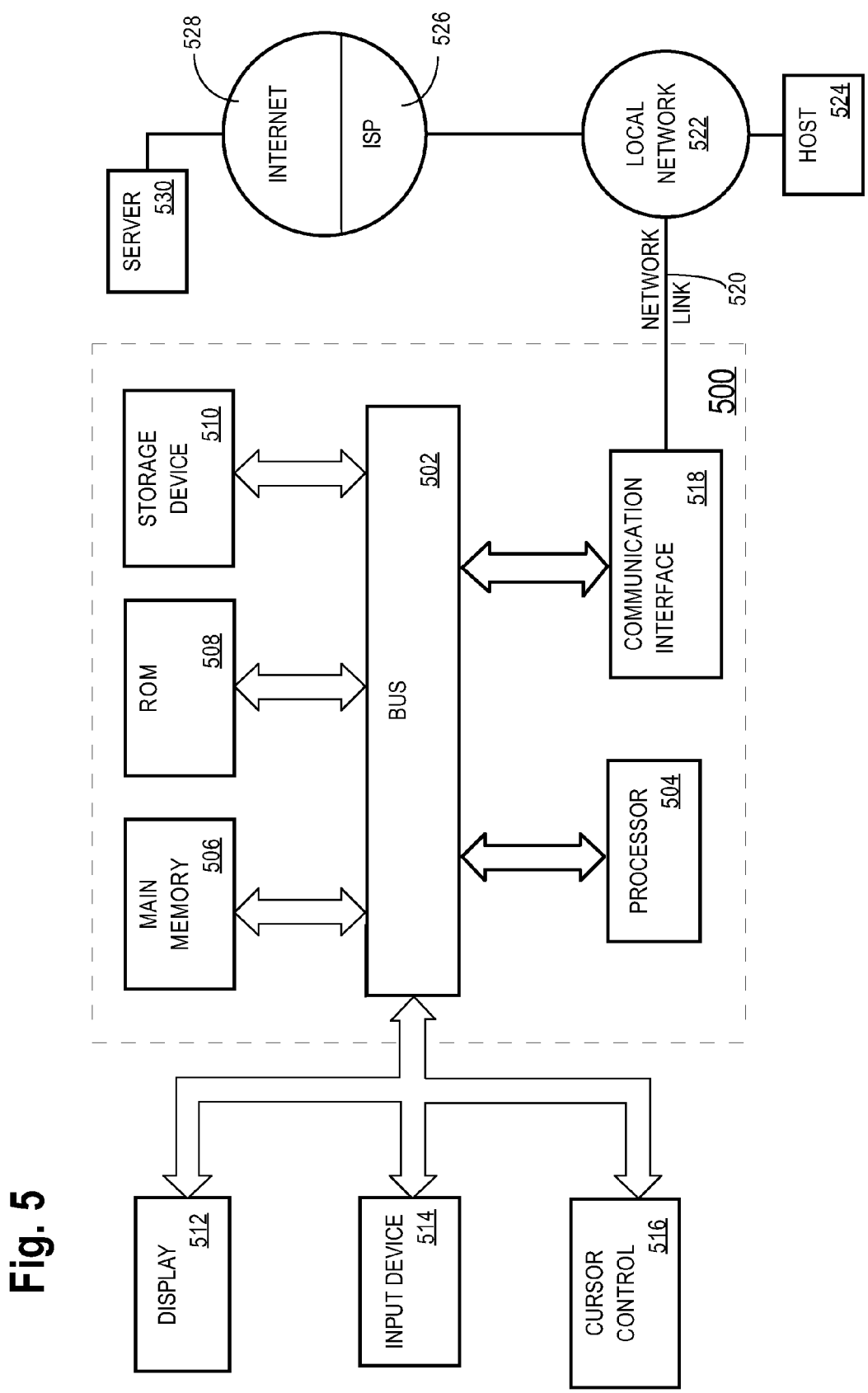
FIG. 5 is a block diagram that illustrates a computer system upon which an embodiment in accordance with the present invention may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any media that store data and/or instructions that cause a machine to operate in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method for predicting a future period of stress for a computer system, the method comprising:
    collecting a first set of granular monitoring data reflecting activity of the computer system over a first period of time;
    computing a first set of rollup metric values from the first set of granular monitoring data;
    determining a prediction threshold for a particular performance metric of the computer system based at least in part upon at least a portion of the first set of rollup metric values;
    collecting a second set of granular monitoring data reflecting activity of the computer system over a second period of time;
    wherein the second period of time ends after the first period of time ends;
    computing a second set of rollup metric values from the second set of granular monitoring data;
    based at least in part upon the second set of rollup metric values, generating a prediction that predicts a particular value for the particular performance metric at a particular time in the future relative to a time at which the prediction is generated;
    comparing the particular value to the prediction threshold to determine whether an alert should be generated;
    generating the alert in response to determining that the particular value exceeds the prediction threshold;
    wherein the method is performed by one or more computing devices.

2. The method of claim 1, wherein the particular performance metric is central processor unit (CPU) utility of the computer system.

3. The method of claim 1, wherein the particular performance metric is a system health indicator of the computer system.

4. The method of claim 1, wherein the particular time is approximately thirty minutes in the future relative to the time at which the prediction is generated.

5. The method of claim 1, further comprising:
    determining a critical threshold for the particular performance metric based at least in part upon the first set of rollup metric values.

6. The method of claim 5, further comprising:
    determining the prediction threshold based at least in part upon the critical threshold and a recall-precision curve.

7. The method of claim 1, further comprising:
    determining the prediction threshold based at least in part upon a user-specified parameter that specifies an upper limit on an allowable number of false positive predictions per period of time.

8. The method of claim 7, wherein the period of time is one day.

9. The method of claim 1, further comprising:
    determining a critical threshold for the particular performance metric based at least in part upon the first set of rollup metric values;

determining a relax threshold based at least in part on the critical threshold;
maintaining the alert as open during a third period of time;
wherein the third period of time starts and ends after the particular time;
collecting a third set of granular monitoring data reflecting activity of the computer system over the third period of time;
computing a third set of time ordered rollup metric values from the third set of granular monitoring data;
determining the start of the third period of time upon detecting a first particular rollup metric value of the third set of time ordered rollup metric values that exceeds the critical threshold; and
determining the end of the third period of time upon detecting (a) a second particular rollup metric value of the third set of time ordered rollup metric values that is below the relax threshold and (b) that no rollup metric value of the third set of time ordered rollup metric values between the first particular rollup metric value and the second particular rollup metric values exceeds the critical threshold.

10. The method of claim 1, wherein generating the prediction includes using a generalized linear model regression algorithm to generate the prediction.

11. The method of claim 1, wherein:
the prediction is a first prediction;
the particular value is a first particular value;
the prediction threshold is a first prediction threshold;
the method further comprises:
determining a second prediction threshold for the particular performance metric of the computer system based at least in part upon the first set of rollup metric values;
causing a representation of the generated alert to be displayed on a computer display;
collecting a third set of granular monitoring data reflecting activity of the computer system over a third period of time;
wherein the third period of time ends after the second period of time ends;
computing a third set of rollup metric values from the third set of granular monitoring data;
based at least in part upon the third set of rollup metric values, generating a second prediction that predicts a second particular value for the particular performance metric at a second particular time in the future relative to a time at which the second prediction is generated;
wherein the second particular time is after the first particular time;
comparing the second particular value to the second prediction threshold to determine whether the alert should be updated;
causing the displayed representation of the generated alert to be updated in response to determining that the second particular value exceeds the second prediction threshold.

12. The method of claim 11, wherein the second prediction threshold is greater than the first prediction threshold.

13. The method of claim 1, further comprising:
determining a first subset of the first set of rollup metric values that represent an onset of a first period of stress for the computer system during the first period of time;
determining a second subset of the first set of rollup metric values that represent the first period of stress for the computer system during the first period of time;
wherein determining the prediction threshold comprises determining the prediction threshold for the particular performance metric of the computer system based at least in part upon the first subset but not based on the second subset.

14. A non-transitory computer-readable medium storing instructions which, when executed by one or more processors, cause the one or more processors to perform a method for predicting a future period of stress for a computer system, the method comprising:
collecting a first set of granular monitoring data reflecting activity of the computer system over a first period of time;
computing a first set of rollup metric values from the first set of granular monitoring data;
determining a prediction threshold for a particular performance metric of the computer system based at least in part upon at least a portion of the first set of rollup metric values;
collecting a second set of granular monitoring data reflecting activity of the computer system over a second period of time;
wherein the second period of time ends after the first period of time ends;
computing a second set of rollup metric values from the second set of granular monitoring data;
based at least in part upon the second set of rollup metric values, generating a prediction that predicts a particular value for the particular performance metric at a particular time in the future relative to a time at which the prediction is generated;
comparing the particular value to the prediction threshold to determine whether an alert should be generated;
generating the alert in response to determining that the particular value exceeds the prediction threshold;
wherein the method is performed by one or more computing devices.

15. The non-transitory computer-readable medium of claim 14, wherein the particular performance metric is central processor unit (CPU) utility of the computer system.

16. The non-transitory computer-readable medium of claim 14, wherein the particular performance metric is a system health indicator of the computer system.

17. The non-transitory computer-readable medium of claim 14, wherein the particular time is approximately thirty minutes in the future relative to the time at which the prediction is generated.

18. The non-transitory computer-readable medium of claim 14, the method further comprising:
determining a critical threshold for the particular performance metric based at least in part upon the first set of rollup metric values.

19. The non-transitory computer-readable medium of claim 18, the method further comprising:
determining the prediction threshold based at least in part upon the critical threshold and a recall-precision curve.

20. The non-transitory computer-readable medium of claim 14, the method further comprising:
determining the prediction threshold based at least in part upon a user-specified parameter that specifies an upper limit on an allowable number of false positive predictions per period of time.

21. The non-transitory computer-readable medium of claim 20, wherein the period of time is one day.

22. The non-transitory computer-readable medium of claim 14, the method further comprising:
determining a critical threshold for the particular performance metric based at least in part upon the first set of rollup metric values;

determining a relax threshold based at least in part on the critical threshold;

maintaining the alert as open during a third period of time;

wherein the third period of time starts and ends after the particular time;

collecting a third set of granular monitoring data reflecting activity of the computer system over the third period of time;

computing a third set of time ordered rollup metric values from the third set of granular monitoring data;

determining the start of the third period of time upon detecting a first particular rollup metric value of the third set of time ordered rollup metric values that exceeds the critical threshold; and determining the end of the third period of time upon detecting (a) a second particular rollup metric value of the third set of time ordered rollup metric values that is below the relax threshold and (b) that no rollup metric value of the third set of time ordered rollup metric values between the first particular rollup metric value and the second particular rollup metric values exceeds the critical threshold.

23. The non-transitory computer-readable medium of claim 14, wherein generating the prediction includes using a generalized linear model regression algorithm to generate the prediction.

24. The non-transitory computer-readable medium of claim 14, wherein:
the prediction is a first prediction;
the particular value is a first particular value;
the prediction threshold is a first prediction threshold;
the method further comprises:
determining a second prediction threshold for the particular performance metric of the computer system based at least in part upon the first set of rollup metric values;
causing a representation of the generated alert to be displayed on a computer display;
collecting a third set of granular monitoring data reflecting activity of the computer system over a third period of time;
wherein the third period of time ends after the second period of time ends;
computing a third set of rollup metric values from the third set of granular monitoring data;
based at least in part upon the third set of rollup metric values, generating a second prediction that predicts a second particular value for the particular performance metric at a second particular time in the future relative to a time at which the second prediction is generated;
wherein the second particular time is after the first particular time;
comparing the second particular value to the second prediction threshold to determine whether the alert should be updated;
causing the displayed representation of the generated alert to be updated in response to determining that the second particular value exceeds the second prediction threshold.

25. The non-transitory computer-readable medium of claim 24, wherein the second prediction threshold is greater than the first prediction threshold.

26. The non-transitory computer-readable medium of claim 14, the method further comprising:
determining a first subset of the first set of rollup metric values that represent an onset of a first period of stress for the computer system during the first period of time;
determining a second subset of the first set of rollup metric values that represent the first period of stress for the computer system during the first period of time;
wherein determining the prediction threshold comprises determining the prediction threshold for the particular performance metric of the computer system based at least in part upon the first subset but not based on the second subset.

* * * * *

UNITED STATES PATENT AND TRADEMARK OFFICE
CERTIFICATE OF CORRECTION

PATENT NO. : 8,732,534 B2  
APPLICATION NO. : 13/235020  
DATED : May 20, 2014  
INVENTOR(S) : Kini et al.

Page 1 of 1

It is certified that error appears in the above-identified patent and that said Letters Patent is hereby corrected as shown below:

In the Specification

Column 9, line 31, delete "normally" and insert -- normally. --, therefor.

Column 14, line 19, delete "predicition" and insert -- prediction --, therefor.

Signed and Sealed this
Fourteenth Day of October, 2014

Michelle K. Lee
*Deputy Director of the United States Patent and Trademark Office*